United States Patent [19]

Servasier

[11] 3,719,744
[45] March 6, 1973

[54] MANUFACTURE OF SULFUR
[75] Inventor: Alfred Servasier, Bougival, France
[73] Assignee: Societe Nationale des Petroles d'Aquitaine tour d'Aquitaine, Courbevoie, France
[22] Filed: Dec. 1, 1970
[21] Appl. No.: 94,164

Related U.S. Application Data

[63] Continuation-in-part of Ser. No. 728,296, May 10, 1968, abandoned.

[30] Foreign Application Priority Data

May 12, 1967 France..............................67106406

[52] U.S. Cl.................................................423/574
[51] Int. Cl. ............................................C01b 17/04
[58] Field of Search................................23/224–226

[56] References Cited

UNITED STATES PATENTS

| 3,366,455 | 1/1968 | Childers et al. | 23/225 |
| 2,643,939 | 6/1953 | Porter et al. | 23/225 |
| 1,917,689 | 7/1933 | Baum | 23/226 |
| 2,481,411 | 9/1964 | Grace et al. | 23/278 |

FOREIGN PATENTS OR APPLICATIONS 172,074   11/1921   Great Britain..........................23/225

Primary Examiner—G. O. Peters
Attorney—Ostrolenk, Faber, Gerb & Soffen

[57] ABSTRACT

This invention provides a process which, in the catalytic production of sulfur by reacting hydrogen sulfide and sulfur dioxide, includes the steps of stopping the introduction of air and gas containing hydrogen sulfide into the sulfur producing zones and flushing the catalytic reaction zone with steam, superheated and expanded to a temperature of 300°–500° C., whereby the residual sulfur-containing material is removed from the catalytic reaction zone without reducing the temperature at which the catalysts in the reaction zone are active.

10 Claims, No Drawings

MANUFACTURE OF SULFUR

This is a continuation-in-part of application Ser. No. 728,296 filed May 10, 1968, now abandoned.

BACKGROUND OF THE INVENTION

In the production of sulfur by reacting hydrogen sulfide and sulfur dioxide in the presence of a catalyst, it is often necessary to terminate the production of sulfur for a variety of reasons, such as for repair or maintenance of the reactors. Special precautions are necessary at the moment the manufacturing process is halted. It is particularly necessary to discharge the sulfur from those parts of the installation which are functioning at temperatures above the ignition point of the sulfur. It is also advisable to avoid clogging, which can be caused by solidifying sulfur.

The precautions are particularly necessary in Claus units which generally comprise a combustion furnace and several catalytic converters. When these units cease to function, it is necessary to carry out a subsequent flushing to eliminate the remaining sulfur from both the catalytic mass and from the heat exchangers and condensers associated therewith.

The usual procedure undertaken when the sulfur producing units are shut down is to flush the unit by combustion of a gas free of hydrogen sulfide in stoichiometric proportions with air. However, it is difficult to effectively flush the unit. If there is a lack of air, unburned substances and soots are formed which can soil the catalyst and pollute the sulfur which will be subsequently produced. If there is an excess of air, the sulfur remaining in the installation can ignite which, because of the temperature rise, can cause serious corrosion of the apparatus and can deactivate the catalyst.

It has been proposed in U.S. Pat. No. 3,366,455 to introduce an inert gas such as nitrogen, carbon dioxide or steam into the reaction furnace, which has been isolated from the catalytic converters, to cool the furnace. After repair or inspection, the furnace temperature is re-established and then the catalyst is reactivated with a mixture of hot air and gas. While this procedure permits rapid cooling of the furnace, sulfur is not removed from the catalytic converters and it is necessary to restore the temperature in the converters at which the catalyst is active. Catalyst warm-up can require 10 to 48 hours.

Accordingly, it is the object of this invention to provide an improved process for the shutting down of a sulfur producing unit. This and other objects will become apparent to those skilled in the art from the following detailed description.

DESCRIPTION OF THE PREFERRED EMBODIMENTS

This invention will be described with particular reference to the Claus method as represented on the flow sheet. According to the Claus method, a portion of the hydrogen sulfide is oxidized with air and the resulting mixture of sulfur dioxide and hydrogen sulfide reacts in the gaseous phase, first without a catalyst, and then in the presence of a catalyst, to produce the elemental sulfur. A unit functioning in accordance with this method generally comprises a combustion or reaction furnace 1, associated with several catalytic converters 3, 5. Between the furnace 1 and the first converter 3, and after the converters 3, 5, there are condensers 2, 4, 6 in which the sulfur formed is condensed into liquid form, and also reheating systems for the reaction gases.

When the introduction of the gases containing hydrogen sulfide into the combustion furnace is terminated, the inlet or inlets for the air are closed. Steam is injected into the inlet of the first converter 3 through a line 7 and forces the sulfur contained in converter 3 towards condenser 4. When the sulfur is no longer flowing from the outlet of condenser 4, the same operation is carried out on the second converter 5 and eventually on all other converters. It is also possible to flush two or more of the converters simultaneously.

The steam employed can originate from two sources: either from the unit itself as shown at 8 and broken line 10, or from a source external of the unit. In the case where the steam originates from the unit itself, it is obtained from the combustion furnace 1 which has been isolated from the remainder of the unit by means of a partitioning valve 9. The combustion gas burners of the combustion furnace are lighted in order to continue the production of high-pressure steam which is injected after expansion into the converters. The combustion gases produced in the reaction furnace are discharged into the atmosphere by a vent (not shown) which is provided for this purpose and which is situated between the furnace 1 and the first condenser 2.

The superheated steam is maintained at a pressure between 2 and 30 relative bars, preferably between 4 and 10 relative bars, before expansion at the inlet of the unit. After expansion at the inlet, the steam has a slight pressure in excess of atmospheric pressure, typically about 0.5 relative bars, which causes the steam to be a driving force toward the outlet of the condensor which is at atmospheric pressure.

The use of expanded superheated steam at a temperature of 300°–500° C., preferably 350°–500° C. and most preferably 400°–420° C., is essential for accomplishing the objectives of this invention. The present invention allows flushing of the sulfur producing apparatus with a minimum of down time. Conventional flue-gas flushing of the sulfur converters generally requires 6 days. When superheated steam at temperatures of 300° C. and higher is employed, it becomes feasible to reduce this time to less than 2 days. Additionally, at temperatures above 300° C., the quantity of steam required to flush the converter becomes substantially less. For example, flushing a condenser with 255° C. superheated steam requires 80 hours and 2,000 tons of steam while flushing the same condenser with 315° C. superheated steam requires only 36 hours and only 900 tons of steam.

As the temperature of the expanded superheated steam is increased, the amount of the time and amount of steam required for flushing the converter becomes progressively less. At temperatures above 500° C., the saving in time and amount of steam employed continues to grow but at a very slow rate. Moreover, above 500° C. the normal working reaction of the catalytic converter, i.e., the reaction of hydrogen sulfide and sulfur dioxide to produce elemental sulfur and water, reverses. This results in the evolution of hydrogen sulfide and has additionally been found to result in corrosion of the inner walls of the converter.

It is preferred to employ steam at a temperature of about 300°–500° C. and a pressure between 2 and 30 relative bars before expansion. It is well known that upon expansion, the temperature of the steam will decrease which will result in requiring more time for flushing and an increased amount of steam. On the other hand, it is necessary to expand the steam in order to have a driving force for flushing the apparatus. It has been found that 30 relative bars of pressure is a practical limit for the superheated steam before expansion. By employing a pressure of 2 to 30 relative bars, a low temperature drop of the superheated steam is obtained and the cost of pumping the steam is relatively low.

The weight of superheated steam injected into the apparatus is generally of the same order as the production of sulfur. The linear velocity in meters per second, equal to the volume of steam injected per second divided by the section of the catalytic converter, is generally between 0.2 and 1 meter per second and preferably between 0.25 and 0.35 meter per second.

The catalyst in the catalytic converter is active at elevated temperatures and is generally maintained at about 205°–230° C. The thermal inertia of the converter is such that when expanded superheated steam at 300°–500° C. is employed, the temperature in the converter does not vary substantially during the flushing. Therefore, the catalyst is never deactivated and there is no addition to the down time of the sulfur unit contributed by reactivating a cooled catalyst. For example, an additional 10 to 48 hours of down time is added when a catalyst which has been cooled to about 40° C. is reheated to operating temperature by a gas at about 260° C. Therefore, the present invention decreases down time of the sulfur producing unit not only by decreasing the amount of time required for flushing the catalytic converters but also by avoiding the necessity of reactivating the catalyst in the converters.

The following examples serve to further illustrate the invention but are not intended to limit it. Unless otherwise specified throughout this specification and claims, all temperatures are stated in °C. In the following examples, the pressure of the expanded superheated steam is 0.5 relative bars and the steam was supplied at the rate of 25 tons per hour. Each example was performed with a Claus unit, as hereinbefore described, which had a daily production rate of 500 tons of sulfur obtained from an acid gas which contained 60 percent hydrogen sulfide, 35 percent of carbon dioxide, 1 percent of methane and 4 percent of water.

EXAMPLE I

The introduction of the acid gas and air of combustion to the Claus unit was stopped and steam which had been superheated to 420° C. and which was at a pressure of 4 relative bars before expansion was injected upstream of the first converter. When the condenser situated downstream from the first condenser was no longer producing sulfur, i.e., after 12 hours, the flushing operation was carried out in a similar manner and successively on each of the following converters. The total duration of these operations was 24 hours for a unit having two converters.

EXAMPLES II–IX

Example I was repeated except that the temperature and pressure of the superheated steam before expansion was varied. The results are given in the following Table in which $T_1$ is the temperature in degrees C. of the superheated steam before expansion, P is the pressure in bars relative of the superheated steam before expansion, $T_2$ is the temperature in °C. of the superheated steam after expansion, to 0.5 relative bar Hours is the number of hours required to flush the unit containing two converters, and S/Tons indicates the tons of steam employed to completely flush the unit.

TABLE

| Example | $T_1$ | P | $T_2$ | Hours | S/Tons |
|---------|-------|-----|-------|-------|--------|
| II      | 290   | 24  | 255   | 80    | 2000   |
| III     | 290   | 1   | 290   | 48    | 1200   |
| IV      | 327   | 11  | 315   | 36    | 900    |
| V       | 360   | 7   | 350   | 24    | 600    |
| VI      | 394   | 9   | 390   | 16    | 400    |
| VII     | 420   | 4   | 415   | 12    | 300    |
| VIII    | 510   | 31  | 480   | 10    | 250    |
| IX      | 510   | 2   | 510   | 9     | 225    |

Examples II–IX demonstrate many of the advantages of the present invention. When the temperature of the expanded superheated steam rose above 300° C., the amount of time required to flush the unit and the amount of steam required to flush the unit dropped significantly. When the temperature of the expanded superheated steam rose above 500° C., the amount of time and steam required continued to decrease but at a much slower rate. Additionally, in Example IX where the temperature of the expanded superheated steam was 510° C., the discharge from the condensers was observed to contain hydrogen sulfide and sulfur dioxide and the inner walls of the catalytic converters were observed to have been corroded.

Various changes and modifications can be made in the process of this invention without departing from the spirit and scope thereof. The various embodiments of the invention disclosed herein serve to further illustrate the invention but are not intended to limit it.

I claim:

1. In a process for producing sulfur by oxidizing hydrogen sulfide with air in a combustion zone to produce sulfur dioxide and thereafter reacting the sulfur dioxide with hydrogen sulfide in a catalytic reaction zone, the improvement which comprises stopping the introduction of air for combustion and gas containing hydrogen sulfide, and flushing the catalytic reaction zone with a stream of superheated steam at a temperature of 300-500° C. whereby the residual sulfur containing material is removed therefrom without substantially changing the temperature within the catalytic reaction zone.

2. The process of claim 1 wherein the temperature of the superheated steam is 350°–500° C.

3. The process of claim 1 wherein the stream of superheated steam originates from an external source.

4. The process of claim 1 wherein the stream of superheated steam is produced by the combustion zone which has been isolated from the reaction zone.

5. The process of claim 1 wherein the linear velocity of the stream of superheated steam in the catalytic reaction zone is between 0.2 and 1 meter per second.

6. The process of claim 1 wherein the sulfur production is obtained in accordance with the Claus process.

7. The process of claim 1 wherein the superheated steam is at a temperature of 350°–500° C., and the linear velocity of the stream of superheated steam is between 0.25 and 0.35 meter per second.

8. The process of claim 7 wherein the heating means and condensing means associated with the catalytic reaction zone are flushed with the stream of superheated steam.

9. The process of claim 1 wherein the temperature of the superheated steam is 400°–420° C.

10. In a process for producing sulfur by oxidizing hydrogen sulfide with air in a combustion zone to produce sulfur dioxide and thereafter reacting the sulfur dioxide with hydrogen sulfide in a catalytic reaction zone, the improvement which consists essentially of stopping the introduction of air for combustion and gas containing hydrogen sulfide, introducing into said catalytic reaction zone a stream of pressurized superheated steam at a temperature of 300°–500° C. and flushing the catalytic reaction zone with said superheated steam thereby removing the residual sulfur-containing material therefrom without substantially changing the temperature within the catalytic reaction zone.

* * * * *